United States Patent
Patel et al.

(10) Patent No.: US 9,480,017 B2
(45) Date of Patent: Oct. 25, 2016

(54) DYNAMIC POWER MANAGEMENT CONTROL

(71) Applicant: QUALCOMM Incorporated, San Diego, CA (US)

(72) Inventors: Hardik M Patel, San Diego, CA (US); Todd R Sutton, Del Mar, CA (US); Frederic Bossu, San Diego, CA (US); Chris M Rosolowski, San Diego, CA (US); Helena Deirdre O'Shea, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 237 days.

(21) Appl. No.: 13/764,350

(22) Filed: Feb. 11, 2013

(65) Prior Publication Data
US 2014/0228079 A1    Aug. 14, 2014

(51) Int. Cl.
*H04W 52/00* (2009.01)
*H04W 52/02* (2009.01)

(52) U.S. Cl.
CPC ..... *H04W 52/0225* (2013.01); *H04W 52/0245* (2013.01); *Y02B 60/50* (2013.01)

(58) Field of Classification Search
CPC ................ H04W 52/0261; H04W 52/0283
USPC .................................. 455/522, 69
See application file for complete search history.

(56) References Cited

U.S. PATENT DOCUMENTS

| | | | |
|---|---|---|---|
| 2005/0186923 A1* | 8/2005 | Chen | H04W 52/343 455/127.1 |
| 2005/0197151 A1* | 9/2005 | Arimitsu | 455/522 |
| 2006/0003789 A1* | 1/2006 | Murata et al. | 455/522 |
| 2006/0068731 A1* | 3/2006 | Seier | H04M 1/72516 455/226.2 |
| 2006/0068830 A1 | 3/2006 | Klomsdorf et al. | |
| 2007/0223626 A1 | 9/2007 | Waxman | |
| 2009/0029652 A1 | 1/2009 | Xie et al. | |
| 2009/0080349 A1* | 3/2009 | Rofougaran | 370/311 |
| 2009/0298415 A1 | 12/2009 | Gudem et al. | |
| 2010/0019834 A1 | 1/2010 | Zerbe et al. | |
| 2011/0130105 A1* | 6/2011 | Chan | H03G 3/3042 455/127.2 |
| 2011/0292855 A1 | 12/2011 | Saha et al. | |
| 2011/0306311 A1 | 12/2011 | Chang et al. | |
| 2012/0047379 A1 | 2/2012 | Chen et al. | |
| 2012/0242309 A1 | 9/2012 | Korzeniowski | |
| 2013/0059554 A1* | 3/2013 | Ripley | H04B 1/1607 455/127.1 |

OTHER PUBLICATIONS

International Search Report and Written Opinion—PCT/US2014/014710—ISA/EPO—May 16, 2014.

* cited by examiner

*Primary Examiner* — Wen Huang
(74) *Attorney, Agent, or Firm* — Arent Fox LLP

(57) ABSTRACT

Exemplary embodiments are related to enhancing power efficiency of an electronic device. A device may include a power management module and a radio-frequency (RF) module coupled to the power management module. The device may further include a digital module coupled to each of the power management module and the RF module and configured to dynamically adjust at least one setting of the power management module based on one or more RF conditions.

25 Claims, 4 Drawing Sheets

DYNAMIC POWER MANAGEMENT CONTROL

BACKGROUND

1. Field

The present invention relates generally to power management of an electronic device. More specifically, the present invention relates to embodiments for optimizing power efficiency of an electronic device based on radio-frequency performance.

2. Background

Advances in technology have resulted in smaller and more powerful mobile computing devices. For example, there currently exist a variety of mobile computing devices, including wireless computing devices, such as mobile wireless telephones and personal digital assistants (PDAs). As technology advances, power efficiency of mobile devices has become increasingly important and reducing an amount of power utilized by a mobile device is desirable. Such reduction can result in extended battery life and decreased cost to use the mobile device.

An electronic device, such as a mobile wireless telephone, may include a power management module, such as a power management integrated circuit (PMIC). A PMIC may be configured to receive power from a power supply and provide regulated power to one or more modules (e.g., a radio-frequency integrated circuit (RFIC)) within the electronic device in response to power requirements thereof.

Phase-locked loops (PLLs) within RFICs are typically highly sensitive to supply noise. This may result in degradation of RF performance parameters. Conventionally, PMIC settings, such as a headroom voltage of one or more low-dropout regulators (LDOs) supplying RFICs, are statically set high enough for a worst case radio-frequency (RF) environment to enable the one or more LDOs to sufficiently suppresses noise and spurs from a switched-mode power supply (SMPS). However, statically setting the LDO headroom voltage or other regulator settings for a worst case RF environment results in wasted power when RF conditions improve. The power penalty due to excessive headroom voltage is further multiplied due to wasted power in other LDOs sub-regulating from the SMPS.

A need exists for improving the power efficiency of an electronic device. More specifically, a need exists for embodiments related to dynamically adjusting at least one power management setting based on at least one RF condition.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Figure 1:
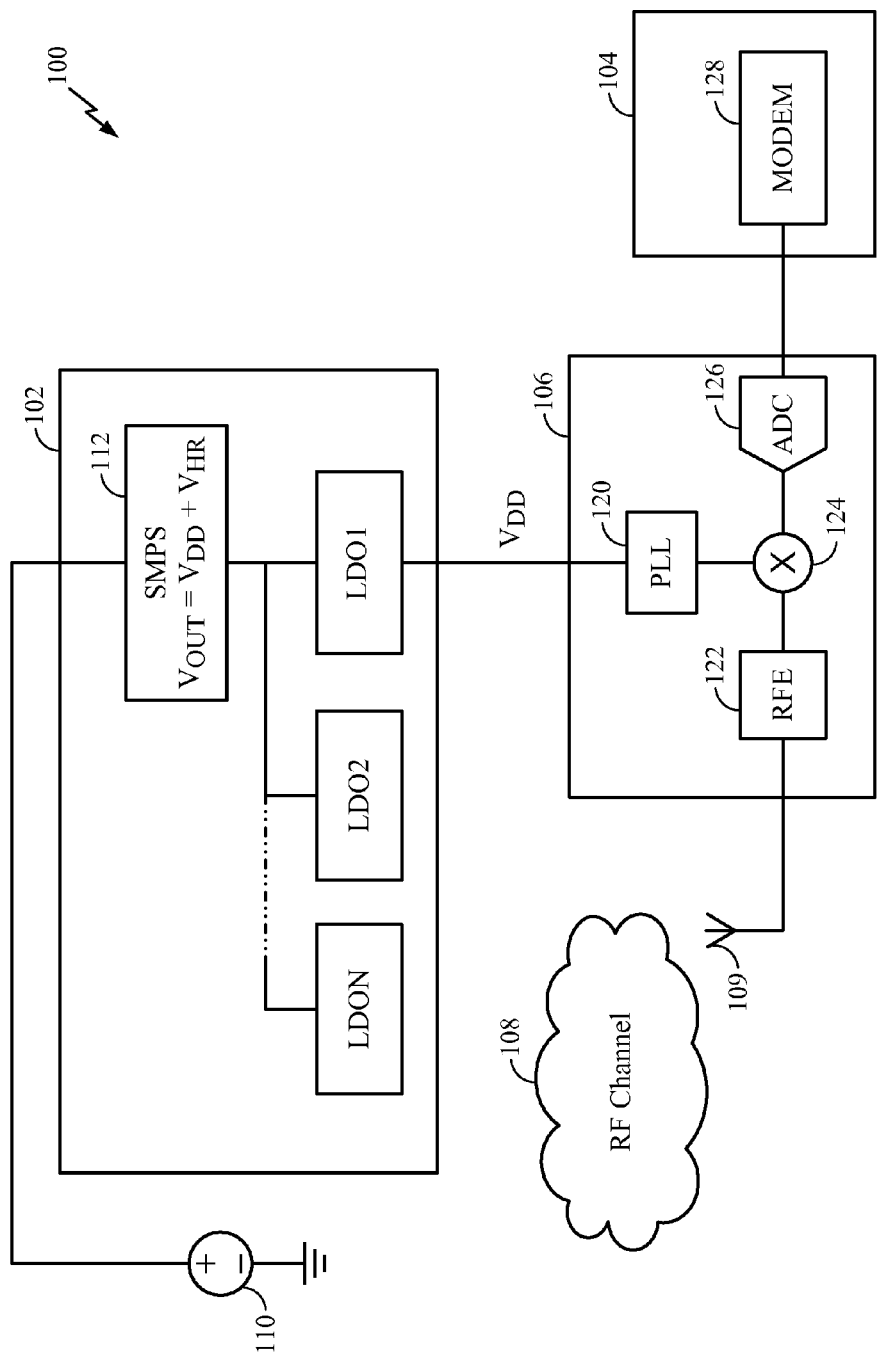
FIG. 1 is a block diagram of a device including a power management module, a radio-frequency module, and a digital module.

FIG. 1 illustrates a device 100 including a power management module 102 coupled to a radio-frequency (RF) module 106, which is further coupled to a digital module 104. Power management module 102 may comprise a power management integrated circuit (PMIC), RF module 106 may comprise a radio-frequency integrated circuit (RFIC), and digital module 104 may comprise a digital integrated circuit (IC).

Power management module 102 includes a switch-mode power supply (SMPS) 112 coupled between a battery 110 and a plurality of low-dropout (LDO) regulators LDO1-LDON. SMPS 112 is configured to receive a voltage from battery 110 and convey an output voltage $V_{OUT}$ to each low-dropout regulator LDO1-LDON. As will be understood by a person having ordinary skill in the art, output voltage $V_{OUT}$ is dependent on a headroom voltage $V_{HR}$ required by low-dropout regulator LDO1, which is coupled to a phase-locked loop (PLL) 120 of RF module 106.

RF module 106 includes PLL 120 coupled to a mixer 124. RF module 106 further includes a receiver front-end (RFE) 122, which is configured to receive a signal via an RF channel 108 and antenna 109. RFE 122 is configured to convey a received signal to mixer 124, which down-converts the signal and conveys a down-converted signal to an analog-to-digital converter (ADC) 126. Upon receipt of an analog signal, ADC 126 may convert the analog signal to a digital signal and convey the digital signal to a modem 128 of digital module 104.

As will be appreciated by a person having ordinary skill in the art, PLL 120 may be highly sensitive to supply noise, which may result in degradation of RF performance parameters, such as error vector magnitude (EVM) and bit error rate (BER). Further, conventionally, one or more settings of power management module 102 are statically configured for a worst case RF environment. For example, the LDO headroom voltage of power management module 102 is statically set to sufficiently suppress noise and spurs from SMPS 112. However, statically setting regulator settings (e.g., LDO headroom voltage) for a worst case RF environment may result in wasted power within when the RF environment improves (i.e., relative to the worst case RF environment). In addition, excessive LDO headroom voltage may further increase the power penalty due to wasted power in other LDOs (e.g., LDO2-LDON) sub-regulating from SMPS 112.

To address power efficiency issues, conventional electronic devices have attempted to minimize PLL noise sensitivity to reduce LDO headroom voltage. However, reducing PLL noise sensitivity usually comes at a cost of higher power consumption or larger die area. Therefore, instead of wasting power inside of an LDO, power is wasted within the PLL. Further, as previously noted, statically setting the LDO headroom voltage for poor RF conditions leads to unneeded power consumption when an RF environment improves.

Another method of addressing power efficiency issues includes powering an RFIC directly from a SMPS and, therefore, removing the LDO and, thus, the power wasted inside the LDO. However, without an LDO to suppress noise and/or spurs, which may exist, the SMPS cannot be used in a pulse-frequency modulation (PFM) mode. As a result, the SMPS is forced to run in a pulse-width modulation (PWM) mode, which may severely degrade efficiency during low load current. As will be understood, PWM efficiency at load currents in most RF modes is very poor compared to PFM.

Exemplary embodiments, as described herein, are directed to embodiments related to dynamically adjusting one or more power settings based on one or more RF conditions. According to one exemplary embodiment, a device may include power management module and a radio-frequency (RF) module coupled to the power management module. The device may further include a digital module coupled to each of the power management module and the RF module and configured to dynamically adjust at least one setting of the power management module based on one or more RF conditions.

According to another exemplary embodiment, the present invention includes methods for optimizing power efficiency of an electronic device. Various embodiments of such a method may include receiving one or more radio-frequency (RF) conditions and dynamically adjusting at least one power management setting based on the one or more RF conditions. Yet another exemplary embodiment of the present disclosure comprises a computer-readable media storage storing instructions that when executed by a processor cause the processor to perform instructions in accordance with one or more embodiments described herein.

Other aspects, as well as features and advantages of various aspects, of the present invention will become apparent to those of skill in the art though consideration of the ensuing description, the accompanying drawings and the appended claims.

Figure 2:
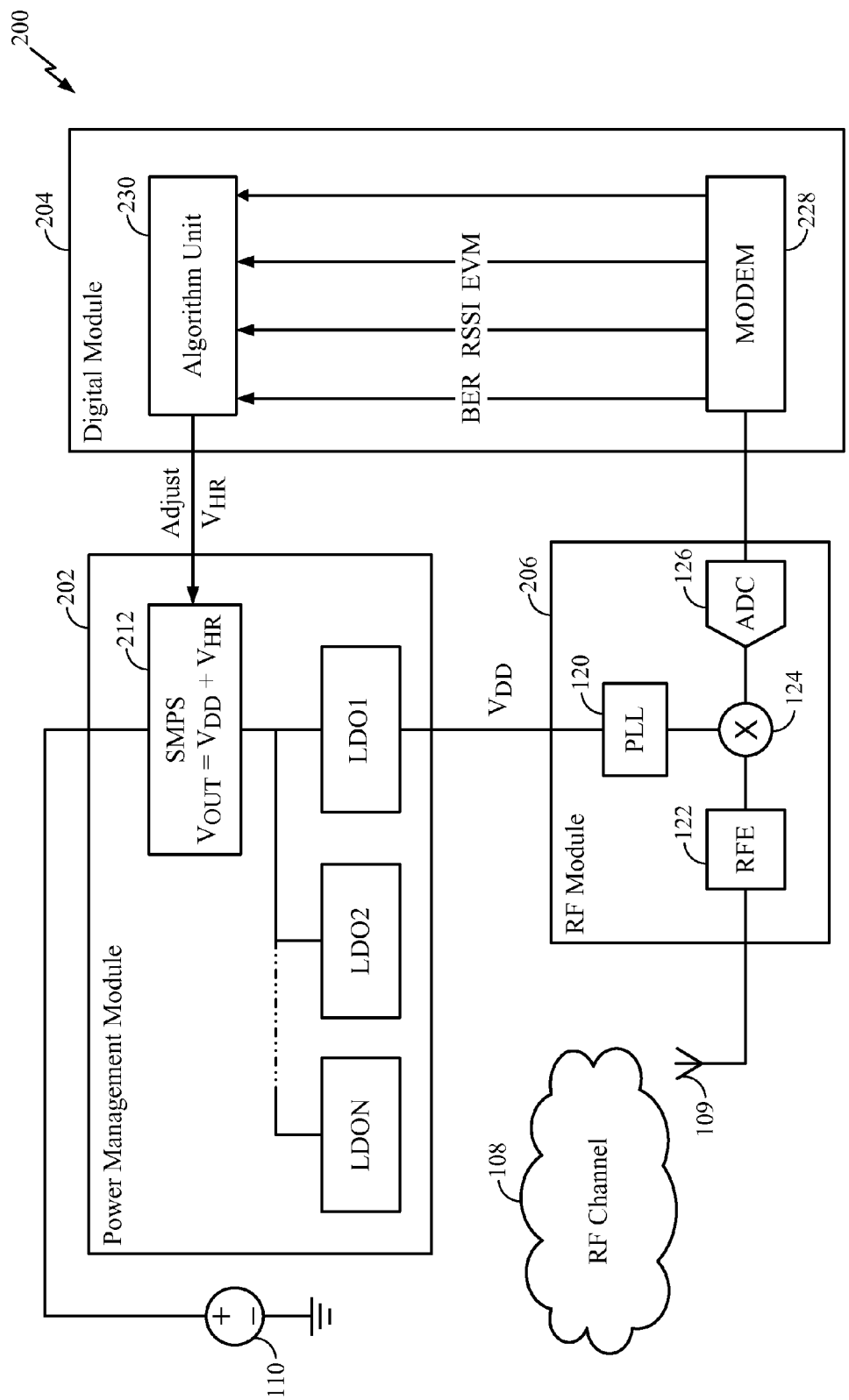
FIG. 2 is a block diagram of a device including a power management module, a radio-frequency module, a digital module, and a power efficiency optimization loop, according to an exemplary embodiment of the present invention.

FIG. 2 illustrates a device 200, according to an exemplary embodiment of the present invention. Device 200 includes a power management module 202 coupled to a radio-frequency (RF) module 206, which is further coupled to a digital module 204. By way of example only, power management module 202 may comprise a power management integrated circuit (PMIC) and RF module 206 may comprise a radio-frequency integrated circuit (RFIC). Further, digital module 204 may comprise a digital integrated circuit (IC).

Power management module 202 includes a switch-mode power supply (SMPS) 212 coupled to a plurality of low-dropout regulators LDO1-LDON. As illustrated in FIG. 2, SMPS 212 is configured to convey an output voltage $V_{OUT}$ to each low-dropout regulator LDO1-LDON. As noted above, output voltage $V_{OUT}$ of SMPS 212 may be dependent on a headroom voltage $V_{HR}$ required by low-dropout regulator LDO1, which is coupled to PLL 120 of RF module 206.

RF module 206 includes phase-locked loop (PLL) 120, which is configured to receive a supply voltage $V_{DD}$ from low-dropout regulator LDO1. PLL 220 is further configured to convey a signal to mixer 124, as will be understood by a person having ordinary skill in the art. RF module 206 further includes receiver front-end (RFE) 122, which is configured to receive a signal via RF channel 108 and antenna 109. RFE 122 is configured to convey a received signal to mixer 124, which down-converts the signal and conveys a down-converted signal to analog-to-digital converter (ADC) 126. Upon receipt of an analog signal, ADC 126 may convert the analog signal to a digital signal and convey the digital signal to a modem 228 of digital module 204. It is noted that modem 228 may be include, or be configured to receive, information related to various parameters related to RF conditions of device 200. For example, modem 228 may include RF information related to a bit error rate (BER) of device 200, a received signal strength indicator (RSSI) of device 200, an error vector magnitude (EVM) of device 200, or any combination thereof.

Digital module 204 further includes an algorithm unit 230, which is coupled to modem 228 of digital module 204 and SMPS 112 of power management module 202. According to an exemplary embodiment of the present invention, algorithm unit 230 is configured to receive one or more signals from modem 228 and convey one or more digital control signals to SMPS 212. More specifically, algorithm unit 230 may be configured to receive, from modem 228, one or more parameters related to RF conditions of device 200, such as the BER, the RSSI, the EVM, or any combination thereof. In response to receipt of the information concerning the RF conditions, algorithm unit 230 may convey one or more control signals to SMPS 212 for adjusting one or more settings of power management module 202. By way of non-limiting examples, algorithm unit 230 may convey one or more control signals to SMPS 212 for adjusting a switching frequency of SMPS 212, one or more internal control circuits of SMPS 212, or headroom voltage $V_{HR}$ of low-dropout regulators LDO1-LDON. It is noted that, according to one exemplary embodiment, power management module settings may be changed while an associated transceiver (not shown in FIG. 2; see transceiver 320 of FIG. 3) of device 200 is not actively transmitting or receiving. It is further noted that, according to one exemplary embodiment, headroom voltage $V_{HR}$ and, thus output voltage $V_{OUT}$, may be adjusted substantially continuously during operation based on current RF conditions.

During a contemplated operation of device 200, headroom voltage $V_{HR}$ of each low-dropout regulator LDO1-LDON may be set to an initial value. For example, headroom voltage $V_{HR}$ of each low-dropout regulator LDO1-LDON may be initially set to a maximum value for worst case RF conditions. Further, modem 228 may convey information (e.g. parameters) related to current RF conditions (e.g., BER, RSSI, and/or EVM of device 200) to algorithm unit 230. In response thereto, algorithm unit 230 may convey a control signal to SMPS 212 to dynamically adjust headroom voltage $V_{HR}$. For example, if the RF conditions of device 200 have improved (i.e., relative to a previous reading), algorithm unit 230 may convey a control signal to SMPS 212 to dynamically decrease headroom voltage $V_{HR}$. As another example, if the RF conditions of device 200 have degraded (i.e., relative to a previous reading), algorithm unit 230 may convey a control signal to SMPS 212 to dynamically increase headroom voltage $V_{HR}$. According to one exemplary embodiment, headroom voltage $V_{HR}$ may be dynamically adjusted in relatively small increments. For example only, headroom voltage $V_{HR}$ may be adjusted in 12.5 mV steps.

During another contemplated operation of device 200, a switching frequency of SMPS 212 may be set to an initial value. For example, the switching frequency of SMPS 212 may be initially set to a maximum value for worst case RF conditions. Further, modem 228 may convey information (e.g. parameters) related to current RF conditions (e.g., BER, RSSI, and/or EVM) to algorithm unit 230. In response thereto, algorithm unit 230 may convey a control signal to SMPS 212 to dynamically adjust the switching frequency of SMPS 212. For example, if the RF conditions of device 200 have improved (i.e., relative to a previous reading), algorithm unit 230 may convey a control signal to SMPS 212 to dynamically decrease the switching frequency. As another example, if the RF conditions of device 200 have degraded (i.e., relative to a previous reading), algorithm unit 230 may convey a control signal to SMPS 212 to dynamically increase the switching frequency.

During yet another contemplated operation of device 200, one or more control circuits of SMPS 212 may be set to an initial configuration. For example, one or more control circuits of SMPS 212 may be initially set to a high-power mode for worst case RF conditions. Further, modem 228 may convey information (e.g. parameters) related to current RF conditions of device 200 (e.g., BER, RSSI, and/or EVM) to algorithm unit 230. In response thereto, algorithm unit 230 may convey a control signal to SMPS 212 to dynamically adjust a configuration of the one or more control circuits. For example, if the RF conditions of device 200 have improved (e.g., beyond a threshold), algorithm unit 230 may convey a control signal to SMPS 212 to dynamically configure the one or more control circuits in a low-power mode. As another example, if the RF conditions of device 200 have degraded (e.g., beyond a threshold), algorithm unit 230 may convey a control signal to SMPS 212 to dynamically configure the one or more control circuits in a high-power mode.

Therefore, in accordance with an exemplary embodiment of the present invention, device 200 may include a power optimization loop, which includes an algorithm unit configured to receive information related to one or more RF conditions and, in response thereto, convey a control signal for adjusting one or more power settings. It is noted that, according one exemplary embodiment, the power optimization loop, as described herein, may have a slow attack rate and a quick back-off rate to ensure minimal impact on RF performance. More specifically, one or more power optimization settings of power management module 202 (e.g. headroom voltage $V_{HR}$) may be slowly modified to slowly improve the power efficiency of device 200 when RF conditions are improving. Further, the one or more power optimization settings (e.g., headroom voltage $V_{HR}$) of power management module 202 may be quickly modified to quickly increase the power consumption of device 200 when RF conditions are degrading. Further, as noted above, power optimization settings can be adjusted when an associated transceiver is not actively transmitting or receiving, so that the peak EVM is not degraded. In addition, because power optimization settings may be adjusted in selectable increments (e.g., headroom voltage $V_{HR}$ may be adjusted in 12.5 mV increments), power may be saved in almost any RF condition.

Figure 3:
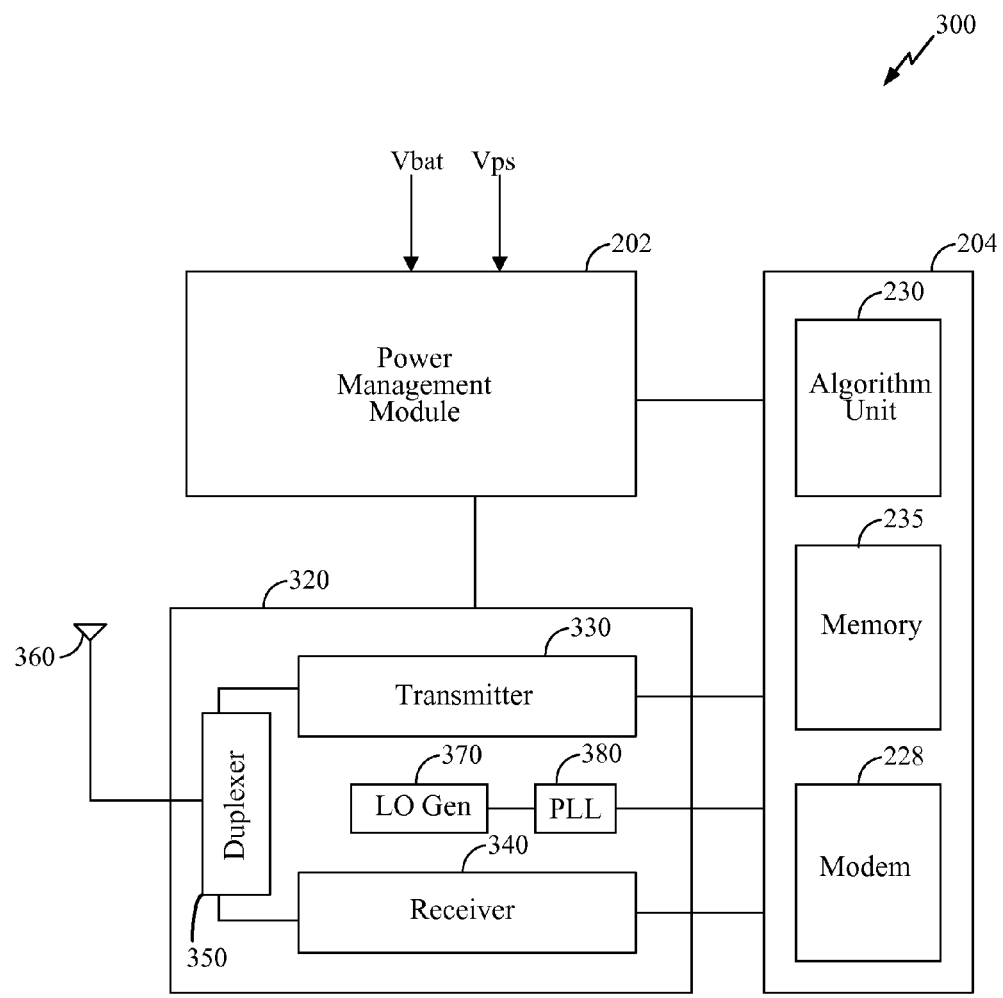
FIG. 3 illustrates an electronic system, in accordance with an exemplary embodiment of the present invention.

FIG. 3 is a block diagram of a wireless communication device 300. In this exemplary design, wireless communication device 300 includes digital module 204, a transceiver 320, and power management module 202. In addition to algorithm unit 230 and modem 228, digital module 204 may comprise memory 235. It is noted that although memory 235 is depicted as external to algorithm unit 230, algorithm unit 230 may comprise memory 235. Further, algorithm unit 230 and/or memory 235 may include instructions which, when read and executed by wireless communication device 300 (e.g., a processor of wireless communication device 300), may cause wireless communication device 300 to perform the steps necessary to implement and/or use embodiments of the present invention.

Transceiver 320 includes a transmitter 330 and a receiver 340 that support bi-directional wireless communication. In general, wireless communication device 300 may include any number of transmitters and any number of receivers for any number of communication systems, any number of frequency bands, and any number of antennas.

In the transmit path, data module 204, which may comprise a data processor, may process data to be transmitted. A digital-to-analog converter (not shown in FIG. 3), which may be within digital module 204 or transceiver 320, may receive the processed data and provide an analog output signal to transmitter 330. Within transmitter 330, the analog output signal may be amplified, filtered to remove images caused by the digital-to-analog conversion, further amplified, and up-converted from baseband to RF. The up-converted signal may then experience further filtering and/or amplification before being routed through switches/duplexer 350, and transmitted via an antenna 360.

In the receive path, antenna 360 may receive signals from base stations and/or other transmitter stations and provides a received signal, which is routed through switches/duplexer 350 and provided to receiver 340. Within receiver 340, after being filtered and/or amplified, the received signal may be down-converted from RF to baseband. The down-converted signal may then experience additional amplification and/or filtering to obtain an analog input signal. An analog-to-digital converter (not shown in FIG. 3), which may be within digital module 204 or transceiver 320, digitizes the analog input signal and provides samples for processing by digital module 204.

FIG. 3 illustrates transmitter 330 and receiver 340 implementing a direct-conversion architecture, which frequency converts a signal between RF and baseband in one stage. Transmitter 330 and/or receiver 340 may also implement a super-heterodyne architecture, which frequency converts a signal between RF and baseband in multiple stages. A local oscillator (LO) generator 370 generates and provides transmit and receive LO signals for up-conversion and down-conversion. A phase locked loop (PLL) 380, which may comprise PLL 120 illustrated in FIG. 2, receives control information from digital module 204 and provides control signals to LO generator 370 to generate the transmit and receive LO signals at the proper frequencies. Power management module 202 receives a battery voltage (Vbat) and/or a power supply voltage (Vps) and generates supply voltages for digital module 204 and transceiver 320. All or a portion of transceiver 320 may be implemented on one or more analog ICs, RF ICs (RFICs), mixed-signal ICs, etc. For example, transceiver 320 may be implemented within an RF module, such as RF module 206 illustrated in FIG. 2.

Figure 4:
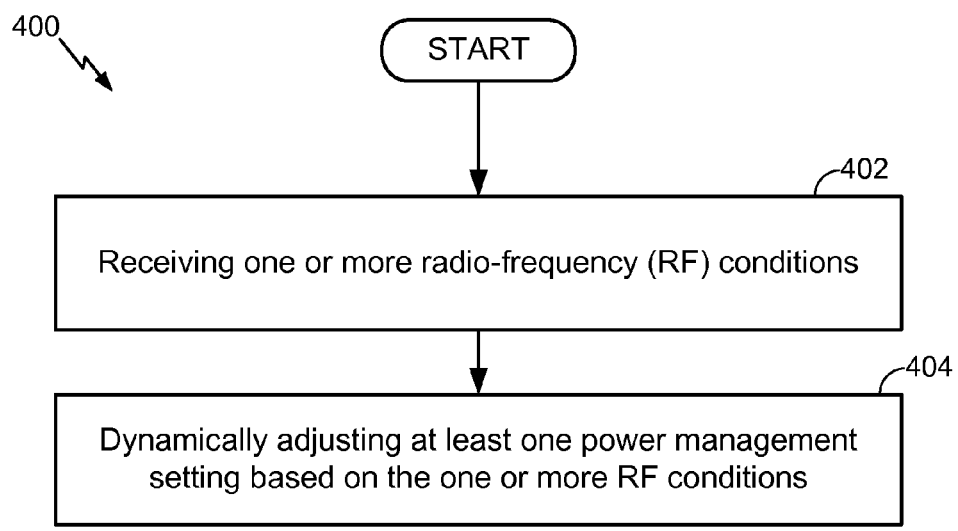
FIG. 4 is a flowchart illustrating a method, according to an exemplary embodiment of the present invention.

FIG. 4 is a flowchart illustrating a method 400, in accordance with one or more exemplary embodiments. Method 400 may include receiving one or more radio-frequency (RF) conditions (depicted by numeral 402). By way of example only, the one or more RF conditions may comprise a bit error rate (BER), a received signal strength indicator (RSSI), and/or an error vector magnitude (EVM). Method 400 may also include dynamically adjusting at least one power management setting based on the one or more RF conditions (depicted by numeral 404). For example, one or more of a headroom voltage, a switching frequency, and a control circuit configuration (e.g., high-power mode or low-power mode) may be dynamically adjusted in response to the one or more RF conditions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
   a power management module;
   a radio frequency (RF) module coupled to the power management module; and
   a digital module coupled to each of the power management module and the RF module and configured to dynamically adjust a headroom voltage of the power management module based on one or more RF conditions, wherein the digital module is configured to adjust the headroom voltage at a first rate while the one or more RF conditions are improving relative to a previous RF condition and a second, faster rate while the one or more RF conditions are worsening relative to the previous RF condition,
   wherein the power management module is configured to receive the adjusted headroom voltage and to convey to the RF module an adjusted supply voltage based at least in part on the adjusted headroom voltage.

2. The device of claim 1, the power management module comprising a power management integrated circuit (PMIC), the RF module comprising a radio-frequency integrated circuit (RFIC), and the digital module comprising a digital integrated circuit.

3. The device of claim 1, the one or more RF conditions comprising one or more of a received signal strength indicator (RSSI), an error vector magnitude (EVM), and a bit error rate (BER).

4. The device of claim 1, wherein the digital module is configured to incrementally adjust the headroom voltage.

5. The device of claim 1, wherein the digital module is configured to dynamically adjust the headroom voltage in 12.5 millivolt increments.

6. The device of claim 1, wherein the digital module is configured to dynamically adjust the headroom voltage at one of a plurality of adjustment rates.

7. The device of claim 1, wherein the digital module is configured to dynamically adjust the headroom voltage substantially continuously during operation based on the one or more RF conditions.

8. The device of claim 1,
   wherein the power management module comprises a power supply.

9. The device of claim 8,
   wherein the digital module is configured to provide the adjusted headroom voltage to the power supply.

10. The device of claim 9,
    wherein the power management module comprises at least one low dropout (LDO) regulator configured to suppress power supply noise.

11. The device of claim 10,
    wherein the power supply is configured to:
    receive a supply voltage from a power source, and convey an output voltage to the at least one LDO regulator, the output voltage being based on the supply voltage and the adjusted headroom voltage.

12. The device of claim 10,
wherein the LDO regulator is coupled to the power supply and the RF module and is configured to provide the adjusted supply voltage to the RF module.

13. The device of claim 12,
wherein the RF module further comprises a phase-locked loop (PLL), the PLL being configured to receive the adjusted supply voltage from the at least one LDO regulator.

14. The device of claim 8,
wherein the power supply comprises a switched mode power supply (SMPS).

15. A method, comprising:
receiving one or more radio-frequency (RF) conditions;
dynamically adjusting a headroom voltage based on the one or more RF conditions; and
conveying an adjusted supply voltage based at least in part on the adjusted headroom voltage,
wherein the headroom voltage is adjusted at a first rate while the one or more RF conditions are improving relative to a previous RF condition and a second, faster rate while the one or more RF conditions are worsening relative to the previous RF condition.

16. The method of claim 15, wherein receiving the one or more RF conditions comprises receiving the one or more RF conditions from a modem of a digital integrated circuit.

17. The method of claim 15, wherein dynamically adjusting the headroom voltage comprises conveying a control signal from a digital integrated circuit to a power management integrated circuit (PMIC) to dynamically adjust the headroom voltage of the PMIC based on the one or more RF conditions.

18. The method of claim 15, wherein receiving one or more RF conditions comprises receiving at least one of a received signal strength indicator (RSSI), an error vector magnitude (EVM), and a bit error rate (BER).

19. The method of claim 15, wherein dynamically adjusting the headroom voltage further comprises dynamically adjusting at least one of the headroom voltage of a power management module, a switching frequency of the power management module, and a control circuit configuration of the power management module.

20. The method of claim 15, wherein
the adjusted supply voltage is conveyed by a low dropout (LDO) regulator, the LDO regulator receiving a voltage based on a supply voltage and the headroom voltage, and
dynamically adjusting the headroom voltage comprises incrementally adjusting the headroom voltage.

21. The method of claim 15, wherein dynamically adjusting the headroom voltage further comprises adjusting an output voltage of a switched-mode power supply.

22. A non-transitory computer-readable storage medium storing instructions that when executed by a processor cause the processor to perform instructions, the instructions comprising:
receiving one or more radio-frequency (RF) conditions; and
dynamically adjusting a headroom voltage provided based on the one or more RF conditions; and
conveying an adjusted supply voltage based at least in part on the adjusted headroom voltage,
wherein the headroom voltage is adjusted at a first rate while the one or more RF conditions are improving relative to a previous RF condition and a second, faster rate while the one or more RF conditions are worsening relative to the previous RF condition.

23. A device, comprising:
means for receiving one or more radio-frequency (RF) conditions; and
means for dynamically adjusting a headroom voltage based on the one or more RF conditions; and
power management means for receiving the adjusted headroom voltage from the means for dynamically adjusting and conveying, to the means for receiving, an adjusted supply voltage based at least in part on the adjusted headroom voltage,
wherein the headroom voltage is adjusted at a first rate while the one or more RF conditions are improving relative to a previous RF condition and a second, faster rate while the one or more RF conditions are worsening relative to the previous RF condition.

24. The device of claim 23, wherein the means for receiving comprises means for receiving at least one of a received signal strength indicator (RSSI), an error vector magnitude (EVM), and a bit error rate (BER).

25. The device of claim 23, wherein the means for dynamically adjusting comprises means for dynamically adjusting a headroom voltage of a power management module.

* * * * *